United States Patent
Osaki et al.

(10) Patent No.: US 6,863,095 B2
(45) Date of Patent: Mar. 8, 2005

(54) EVAPORATIVE FUEL CONTROL SYSTEM

(75) Inventors: Hiroshi Osaki, Sashima-gun (JP); Takehiro Nagase, Sashima-gun (JP)

(73) Assignee: Kyosan Denki Co., Ltd., Sashima (JP)

( * ) Notice: Subject to any disclaimer, the term of this patent is extended or adjusted under 35 U.S.C. 154(b) by 0 days.

(21) Appl. No.: 10/745,556

(22) Filed: Dec. 29, 2003

(65) Prior Publication Data

US 2004/0144444 A1 Jul. 29, 2004

(30) Foreign Application Priority Data

Jan. 24, 2003 (JP) ......................................... 2003-015603

(51) Int. Cl.⁷ ............................................. B65B 31/00
(52) U.S. Cl. .............................. 141/44; 141/40; 141/52; 141/59; 141/198
(58) Field of Search .............................. 141/37, 39, 40, 141/44, 52, 59, 192, 197, 198, 285, 301, 302, 303; 220/86.2; 137/587–589

(56) References Cited

U.S. PATENT DOCUMENTS 4,821,908 A * 4/1989 Yost ........................... 220/86.2
2003/0213527 A1 * 11/2003 Yanase et al. ................. 141/59

FOREIGN PATENT DOCUMENTS

JP          A 7-151018        6/1995

* cited by examiner

Primary Examiner—Timothy L. Maust
(74) Attorney, Agent, or Firm—Oliff & Berridge, PLC (57) ABSTRACT

An evaporative fuel control system is provided which includes a canister, and a fill-up control valve disposed in a vent line that communicates a fuel tank with the canister for controlling fill-up of the fuel tank. The fill-up control valve includes a casing, a float disposed in a space formed in the casing such that the float is movable up or down in the space, and a valve body provided in an upper portion of the float. In the evaporative fuel control system, the fill-up control valve is located outside and above the fuel tank, and a head difference is provided between a full level of the fuel tank and the fill-up control valve.

14 Claims, 7 Drawing Sheets

RELATED ART

EVAPORATIVE FUEL CONTROL SYSTEM

INCORPORATION BY REFERENCE

The disclosure of Japanese Patent Application No. 2003-015603 filed on Jan. 24, 2003, including the specification, drawings and abstract, is incorporated herein by reference in its entirety.

BACKGROUND OF THE INVENTION

1. Field of the Invention

The invention generally relates to an evaporative fuel control system having a fill-up control valve disposed in a vent line that communicates a fuel tank with a canister, and in particular to such an evaporative fuel control system in which the fill-up control valve is located outside and above the fuel tank so that fuel does not spill out of the top of a filler pipe during refueling immediately after the fuel tank is filled up.

2. Description of Related Art

An automobile, or the like, is provided with a fuel tank that stores fuel to be supplied to a combustion chamber of an engine. The fuel tank is provided with a vent system that allows air to enter or leave the fuel tank in accordance with a reduction or increase in the quantity of fuel in the tank. The vent system communicates the interior of the fuel tank with a canister. If the fuel level in the fuel tank rises above or exceeds the full position, for example, overflowing fuel is fed to the canister, to wet the canister and make it unable to use. In view of this situation, a fill-up control valve is provided in the upper portion of the fuel tank, for shutting off the vent system and preventing air and fuel from being fed to the canister when the fuel in the fuel tank reaches the full level.

In addition to the fill-up control valve as described above, a fuel cut-off valve is also mounted in the fuel tank. The fuel cut-off valve is normally in an open position to keep the interior of the fuel tank exposed or released to the atmosphere so as to adjust variations in the pressure within the fuel tank, and is placed in a closed position when the automobile is inclined or rolls over. The fill-up control valve, fuel cut-off valve, canister and other components cooperate to form an evaporative fuel control system. Thus, the evaporative fuel control system functions to control fill-up of the fuel tank, reduce variations in the pressure in the fuel tank, and prevent discharge or emission of fuel vapors to the outside.

Figure 7:
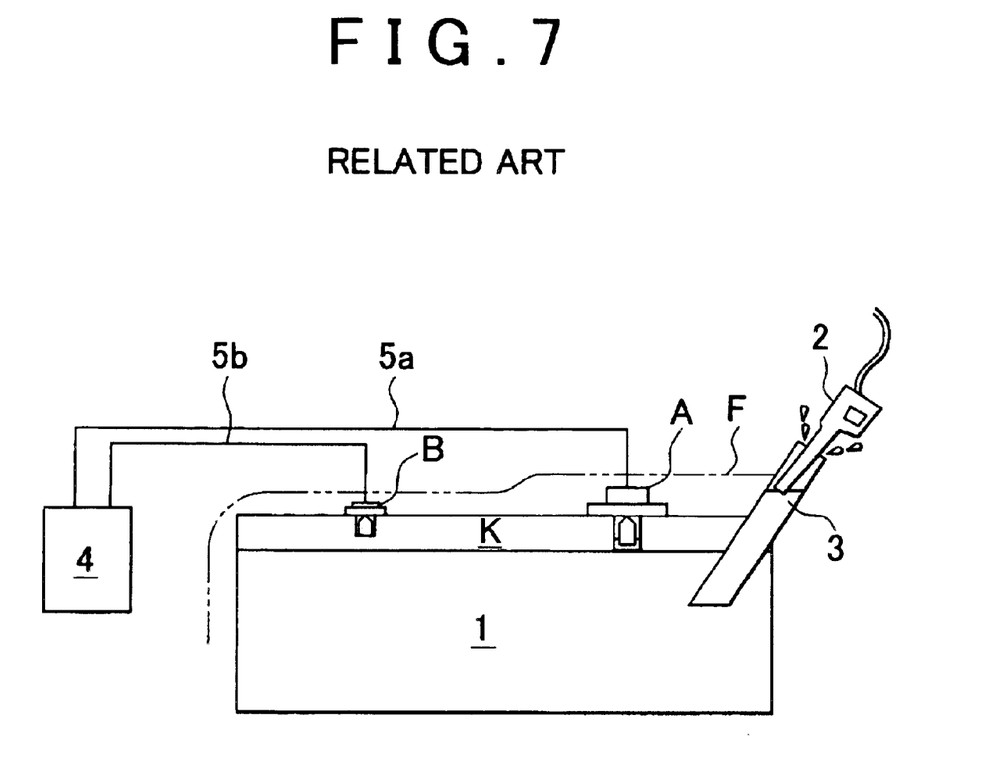
FIG. 7 is a schematic view showing a conventional evaporative fuel control system mounted on a fuel tank.

FIG. 7 shows an example of a fuel tank in which a conventional evaporative fuel control system is installed. As shown in FIG. 7, the fuel tank 1 installed on an automobile, or the like, stores fuel to be supplied to the engine. A fill-up control valve A and a fuel cut-off valve B are mounted in the upper portion of the fuel tank 1. The fill-up control valve A is connected to a canister 4 via a vent line 5a, and the fuel cut-off valve B is connected to the canister 4 via a vent line 5b. To the fuel tank 1 is attached a filler pipe 3 that is closed by a filler cap (not shown). Upon refueling, fuel is supplied to the fuel tank 1 as needed through the filler pipe 3 by means of a fuel supply gun 2. An example of this type of evaporative fuel control system is disclosed in Japanese Laid-open Patent Publication No. 7-151018.

Figure 6:
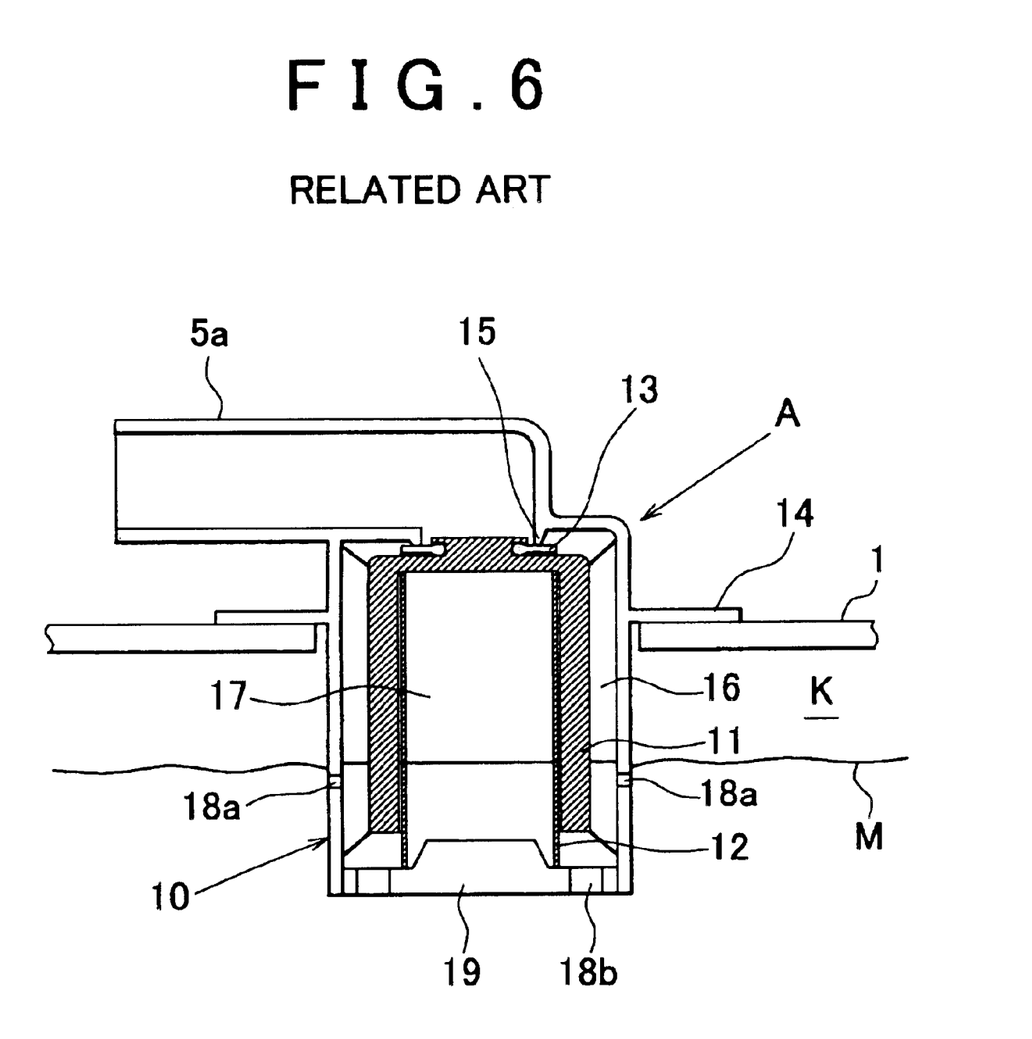
FIG. 6 is an enlarged cross-sectional view of a conventional fill-up control valve.

FIG. 6 shows an example of the fill-up control valve A. The fill-up control valve A includes a casing 10 that is inserted in the fuel tank 1, a float 11 disposed in the casing 10, a spring 12 that urges the float 11 upward, a valve body 13 attached to the upper portion of the float 11, a vent line 5a, and so forth. The vent line 5a is connected at its one end with the downstream side of the valve body 13, and is connected at the other end with the canister 4.

The casing 10 has a hollow, cylindrical shape, and is open at its upper and lower ends. A float chamber 17 is formed in the casing 10, and a valve seat 15 is formed above the float chamber 17. Furthermore, a plurality of vertical ribs 16 are formed at equal intervals on the inner circumferential surface of the casing 10, such that the ribs 16 extend in radial directions from the casing 10 toward the float 11. The vertical ribs 16 serve to guide the float 11 during its vertical movements.

Two or more vent holes 18a are formed through the side wall of the casing 10, and a bottom plate 19 having two or more vent holes 18b is attached to the bottom of the casing 10. In operation, the fuel in the fuel tank 1 enters the float chamber 17 through the vent holes 18a, 18b. Also, a flange 14 is formed on the outer periphery of the casing 10, and the casing 10 is mounted in the fuel tank 1 such that the flange 14 is attached to the upper surface of the tank 1.

With the fill-up control valve A constructed as described above, when fuel is supplied to the fuel tank 1 through the filler pipe 3, and the fuel level in the fuel tank 1 rises and reaches the casing 10 of the fill-up control valve A after a while, the fuel enters the float chamber 17 through the vent holes 18a of the casing 10 and the vent holes 18b of the bottom plate 19. As a result, the fuel pushes up the float 11, and the valve body 13 at the upper surface of the float 11 abuts on the valve seat 15. Since the vent line 5a is closed when the valve body 13 abuts on the valve seat 15, subsequent refueling causes an increase in the pressure in an air chamber K located above the upper surface of the fuel, and the fuel level rises toward the top of the filler pipe 3. When the fuel reaches the tip of the fuel supply gun 2, refueling is automatically stopped. The fuel level reached at this time provides the full position or full level M as indicated in FIG. 6.

In the meantime, the fuel tank 1 of the automobile has been desired to be reduced in size and weight, and has also been desired to be supplied with as much fuel as possible. To this end, the full position of the fuel tank 1 must be set to a high level, resulting in a reduction in the volume of the air chamber K that is left above the upper surface of the fuel when the fuel tank 1 is filled up. In the case of refueling of the fuel tank 1 designed as described above, after the fuel is supplied up to the full position at which the fill-up control valve A is actuated, the pressure in the air chamber K rapidly increases because of the reduced volume of the air chamber K left above the upper surface of the fuel. As the pressure in the air chamber K rapidly increases, the fuel level rapidly rises toward the top of the filler pipe 3, and a part of the fuel may spill out of the top of the filler pipe 3 as shown in FIG. 7.

The fill-up control valve A has the larger size than the fuel cut-off valve B. In the conventional system as described above, the fill-up control valve A, which is mounted on the upper surface of the fuel tank 1, takes up increased space on the upper surface of the tank 1, which may place a large restriction on the location for installation of the fuel tank, in particular, in recent automobiles in which the fuel tank is installed in the remaining space.

Furthermore, the conventional fill-up control valve A and fuel cut-off valve B communicate with the canister 4 via the vent lines 5a, 5b, respectively. This arrangement may require an increased number of pipes and an increased number of assembling steps, which may increase the manufacturing cost.

SUMMARY OF THE INVENTION

It is therefore an object of the invention to provide an evaporative fuel control system which prevents overflow of fuel from the top of a filler pipe by mitigating an increase in the pressure in an air chamber formed above the upper surface of fuel upon fill-up of a fuel tank, and which requires reduced space above the upper surface of the fuel tank, assuring increased flexibility in the choice of the location at which the fuel tank is installed.

To accomplish the above and/or other object(s), there is provided according to one aspect of the invention an evaporative fuel control system comprising (a) a canister, and (b) a fill-up control valve disposed in a vent line that communicates a fuel tank with the canister and adapted to control fill-up of the fuel tank, the fill-up control valve comprising a casing, a float disposed in a space formed in the casing such that the float is movable up or down in the space, and a valve body provided in an upper portion of the float. In this system, the fill-up control valve is located outside and above the fuel tank, and a head difference is provided between a full level of the fuel tank and the fill-up control valve.

With the above arrangement, when the lowest end of a pipe connected to the fill-up control valve for controlling fill-up of the fuel tank is closed by fuel, and the pressure in an air chamber K above the upper surface of the fuel is rapidly elevated, the pressure is applied to the pipe leading to the fill-up control valve, as well as a filler pipe, and pushes the fuel inside the pipe up to the fill-up control valve against the above-indicated head difference. As a result, a rapid increase in the pressure in the filler pipe is mitigated, and the fuel is prevented from overflowing from the top of the filler pipe during refueling. Also, the full-up control valve is not disposed on the upper surface of the fuel tank, and therefore relatively large space is provided above the upper surface of the fuel tank, thus assuring increased flexibility in the choice of the location at which the fuel tank is installed.

In one embodiment of the invention, the evaporative fuel control system further includes a fuel cut-off valve mounted in the fuel tank for discharging fuel vapors in the fuel tank to the canister. With the fuel cut-off valve thus provided, variations in the pressure in the fuel tank are reduced, and fuel vapors in the fuel tank are adsorbed on the canister to be thus prevented from being discharged to the atmosphere.

In another embodiment of the invention, the vent line that communicates the fuel tank with the canister provides a part of a passage that communicates the fuel cut-off valve with the canister. With this arrangement, the number of pipes and the number of assembling steps are reduced.

In a further embodiment of the invention, the fill-up control valve is attached integrally to the canister. With this arrangement, the number of pipes and the number of assembling steps are reduced.

In a still another embodiment of the invention, the fuel tank is installed below a floor of a vehicle body, and the fill-up control valve is disposed above the floor. With this arrangement, the fuel tank may be installed below the floor of a selected one of a large number of locations of the vehicle body, assuring an increased degree of flexibility in the choice of the location at which the fuel tank is installed in an automobile, or the like.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein.

DETAILED DESCRIPTION OF EXEMPLARY EMBODIMENTS

First Embodiment

Figure 1:
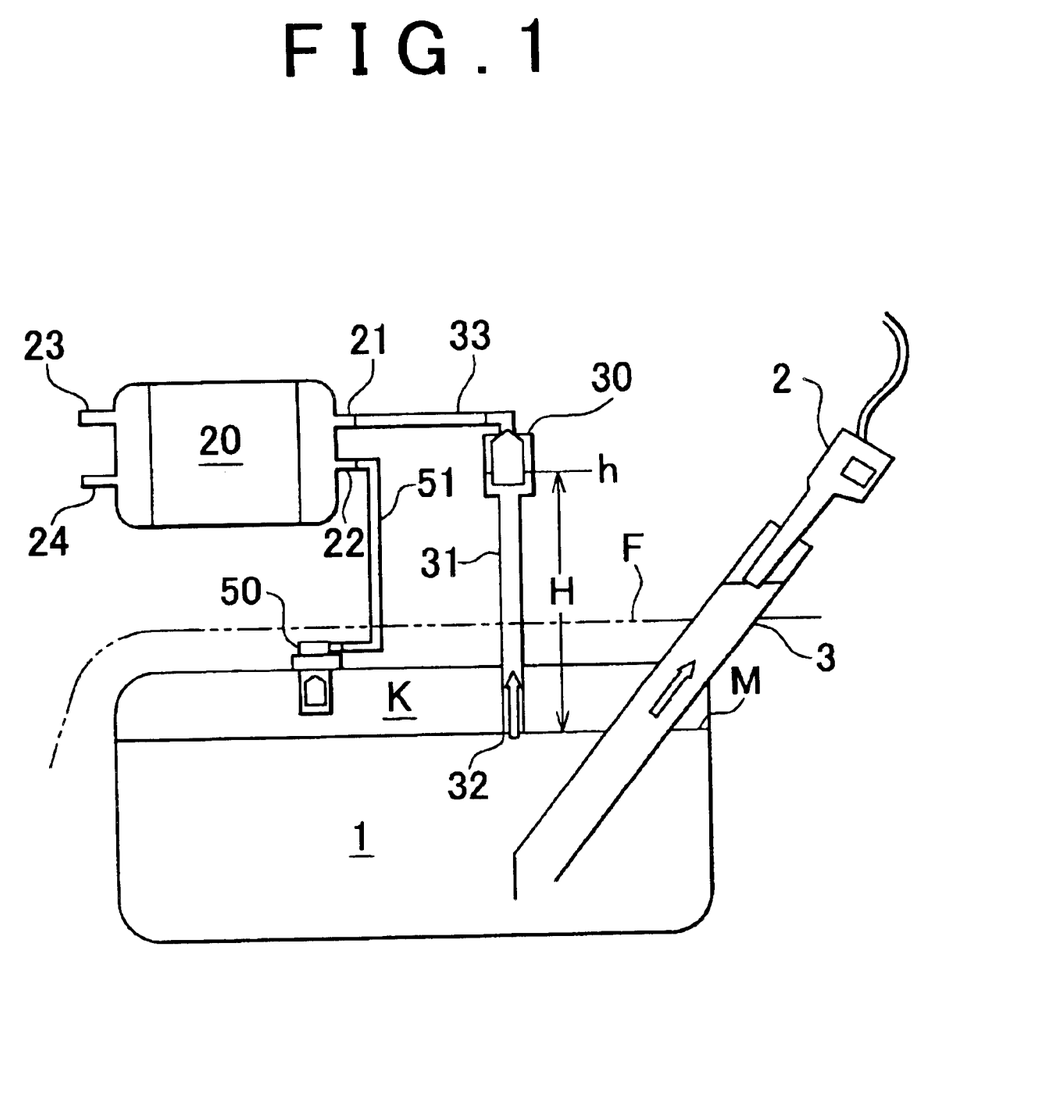
FIG. 1 is a schematic view showing an evaporative fuel control system according to a first embodiment of the invention, which system is mounted on a fuel tank.
Figure 2:
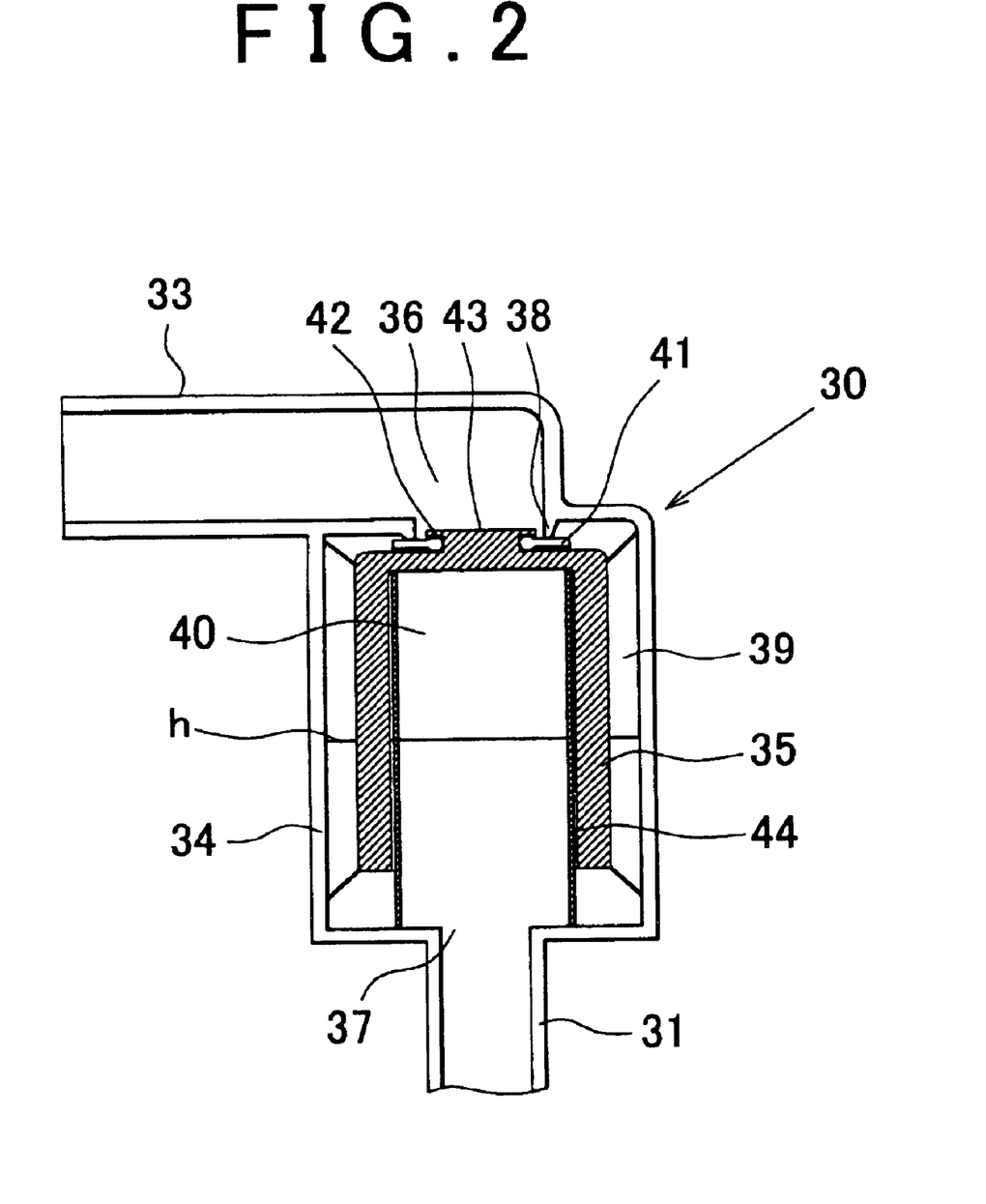
FIG. 2 is an enlarged cross-sectional view showing a fill-up control valve of the evaporative fuel control system of FIG. 1.

FIG. 1 schematically shows an evaporative fuel control system mounted on a fuel tank of, for example, an automobile, and FIG. 2 is an enlarged cross-sectional view of a fill-up control valve of the evaporative fuel control system of FIG. 1.

As shown in FIG. 1, a filler pipe 3 used for refueling is attached to a fuel tank 1, and a cap (not shown) is normally screwed on the top portion of the filler pipe 3. Upon refueling, the cap is removed, and a fuel supply gun 2 is inserted into the upper end portion of the filler pipe 3 so as to supply fuel into the fuel tank 1.

A connecting pipe 31 is connected at one end with a fill-up control valve 30, and the other end portion of the connecting pipe 31 is inserted in the fuel tank 1 substantially in the vertical direction. A pipe end portion 32 at the lowest end of the connecting pipe 31 defines the full position or level M of the fuel tank 1.

The fill-up control valve 30 is located outside and above the fuel tank 1, as shown in FIG. 1. Where the fuel tank 1 is installed on an automobile, or the like, the position of the fill-up control valve 30 is at least above the floor F of the automobile. The connecting pipe 31 is attached to the lower end portion of the fill-up control valve 30, such that the fill-up control valve 30 communicates with the fuel tank 1 via the connecting pipe 31. Also, a vent line 33 is connected at one end to the upper end portion of the fill-up control valve 30 on the downstream side of the valve 30. The vent line 33 is connected at the other end to a canister 20.

A fuel cut-off valve 50 is mounted in the upper portion of the fuel tank 1. Also, a vapor line 51 is connected at one end to the upper end portion of the fuel cut-off valve 50 on the downstream side of the valve 50. The vapor line 51 is connected at the other end to the canister 20, as in the case of the fill-up control valve 30.

The canister 20 serves to adsorb fuel vapors, and has a vent port 21 communicating with the fill-up control valve 30, a vapor port 22 communicating with the fuel cut-off valve 50, a communication port 23 communicating with an intake pipe of an engine (not shown), and an atmosphere port 24 communicating with the atmosphere. In operation, fuel vapors in the fuel tank 1 are introduced into the canister 20 via the fill-up control valve 30 and the fuel cut-off valve 50, and are adsorbed on activated carbon, or the like, charged in the canister 20. The fuel vapors thus adsorbed are then supplied to a combustion chamber of the engine through the communication port 23 and the intake pipe, depending upon the operating conditions of the engine. When the pressure in the fuel tank 1 becomes negative, air is drawn from the atmosphere port 24 into the fuel tank 1 so as to create a positive pressure in the fuel tank 1.

Referring next to FIG. 2, the fill-up control valve 30 will be described in detail. The fill-up control valve 30 mainly consists of a casing 34, a float 35 and a spring 44. The casing 34 is made of a resin, and has a hollow, cylindrical shape having the upper opening 36 and the lower opening 37. Namely, the casing 34 is open at its upper end and lower end. A valve seat 38 is formed on an inner face of a portion of the casing 34 that defines the upper opening 36, and the vent line 33 is connected to the upper opening 36 of the casing 34. Also, a plurality of vertical ribs 39 are formed at equal intervals on the inner circumferential surface of the casing 34 such that the ribs 39 extend from the casing 34 toward the float 35 in radial directions. These vertical ribs 39 function to guide the float 35 during its vertical movements.

The connecting pipe 31 is attached integrally to a portion of the casing 34 that defines the lower opening 37. The other end portion of the connecting pipe 31 hangs in the fuel tank 1, and the pipe end portion 32 at the lowest end of the connecting pipe 31 defines the full position or level M of the fuel tank 1. Within the casing 34 is formed a float chamber 40 in which the float 35 moves up or down. In operation, fuel is allowed to enter the float chamber 40, for example, during refueling or when the automobile is in an inclined condition or rolls over. If fuel enters the float chamber 40, the fuel moves the float 35 upward. As a result, a valve body 41 provided in the upper portion of the float 35 abuts on the valve seat 38 so that the upper opening 36 of the casing 34 is closed. In this manner, the fuel is prevented from flowing toward the canister 20.

The float 35 is made of a resin, and has a generally hollow, cylindrical shape. The float 35 is open at the lower end and is closed at the upper end. A small-diameter columnar protrusion 43 having an annular groove 42 at the outer periphery is formed on the upper surface of the float 35, and a doughnut-like valve body 41 made of a resin is mounted in the annular groove 42 such that an inner edge portion of the valve body 41 engages with the groove 42. When the float 35 moves up to the uppermost position, the upper face of the doughnut-like valve body 41 abuts on the valve seat 38 so as to cut off communication between the float chamber 40 and the vent line 33. The doughnut-like valve body 41 is attached to the annular groove 42 with a certain clearance therebetween so that the valve body 41 surely abuts on the valve seat 38 even if the float 35 slightly inclines, so as to cut off communication between the float chamber 40 and the vent line 33 with high reliability.

A spring 44 is disposed within the float 35. The spring 44 is interposed between the upper face of the inner wall of the float 35 and the inner, bottom face of the casing 34, and serves to assist in upward movement of the float 35. Namely, the spring force of the spring 44 normally does not produce upward movement of the float 35, but acts as force to be added to the buoyant force acting on the float 35 when fuel enters the float chamber 40, so as to quickly move the float 35 upward.

Figure 3:
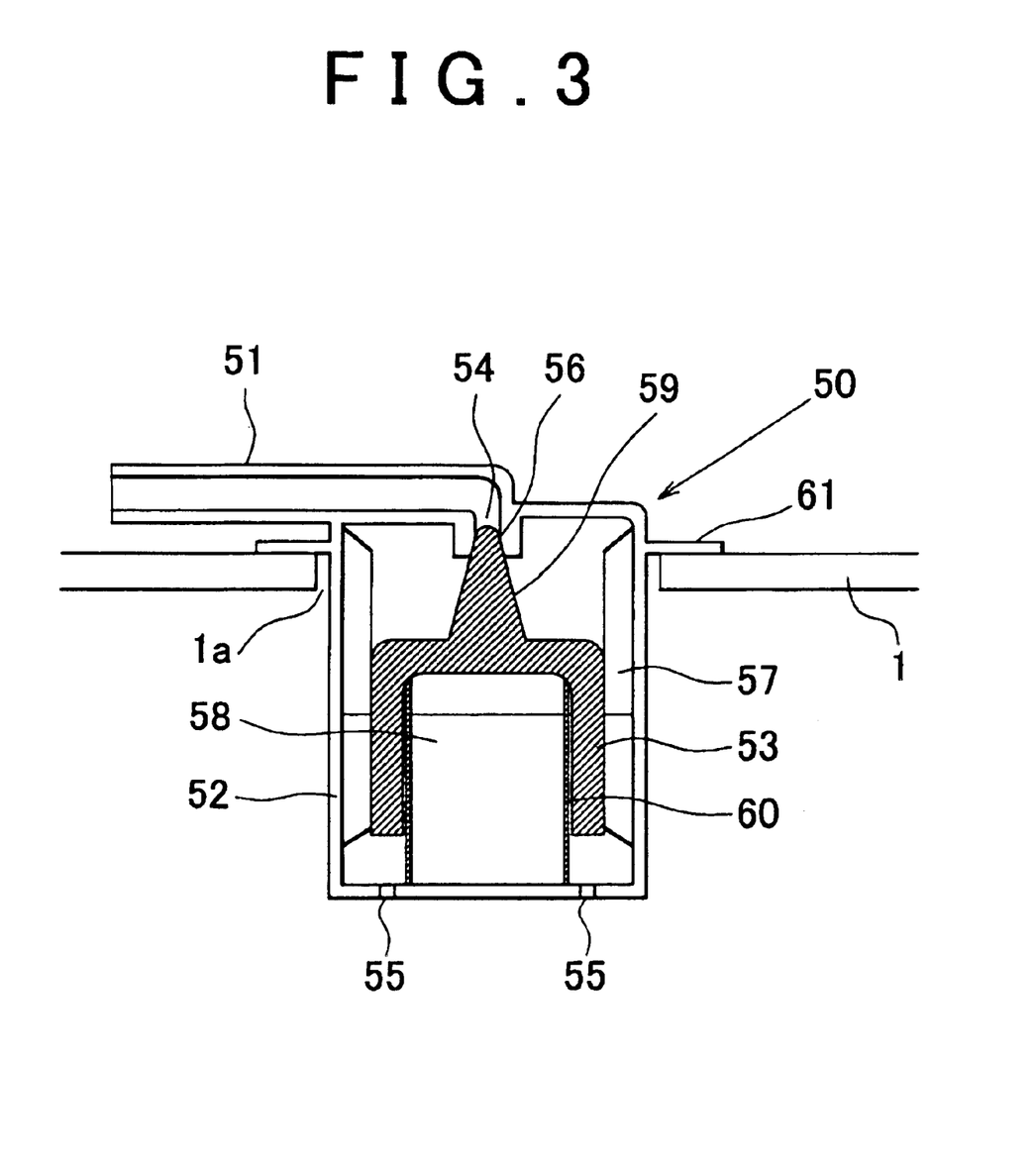
FIG. 3 is an enlarged cross-sectional view showing a fuel cut-off valve of the evaporative fuel control system of FIG. 1.

Referring next to FIG. 3, the fuel cut-off valve 50 will be described in detail. An opening 1a for receiving the fuel cut-off valve 50 is formed through the upper wall of the fuel tank 1, and a casing 52 of the fuel cut-off valve 50 is inserted in the fuel tank 1 through the opening 1a.

The fuel cut-off valve 50 mainly consists of the casing 52, a float 53 and a spring 60. The casing 52 is made of a resin, and is formed in hollow, cylindrical shape with a small-diameter upper opening 54 and two or more small-diameter lower openings 56. The inner face of the casing 52 that defines the small-diameter upper opening 54 provides a valve seat 56, and a vapor passage 51 having the smaller diameter than the vent line 33 extends from the upper opening 54 of the casing 52. A plurality of vertical ribs 57 are formed on the inner circumferential surface of the casing 52 at equal intervals such that the ribs 57 extend from the casing 52 toward the float 53 in radial directions. These ribs 57 serve to guide the float 53 during its vertical movements.

An annular flange 61 is formed on the side wall of the casing 52, and the fuel cut-off valve 50 is mounted in the fuel tank 1 such that the flange 61 is attached to the upper surface of the fuel tank 1. The lower openings 55 formed through the bottom wall of the casing 52 are located at the higher position than the full position M, as shown in FIG. 1. Furthermore, a float chamber 58 in which the float 53 moves up or down is formed in the casing 52. In operation, fuel in the fuel tank 1 enters the float chamber 58, for example, when the automobile is in an inclined condition or rolls over. When fuel enters the float chamber 58, the fuel moves the float 53 upward. As a result, a conical valve body 59 formed on top of the float 53 abuts on the valve seat 56, so as to prevent the fuel from flowing toward the canister 20.

When the fuel tank 1 is in a horizontal position, on the other hand, the lower openings 55 at the bottom of the fuel cut-off valve 50 are not immersed in the fuel even when the fuel tank 1 is filled up, and therefore the upper opening 54 is kept open. In this condition, the fuel cut-off valve 50 surely reduces variations in the pressure in the fuel tank 1, and discharges fuel vapors to the canister 20 via the vapor passage 51. The fuel cut-off valve 50 is smaller in size than the fill-up control valve 30. Thus, even where the fuel cut-off valve 50 is mounted on the upper wall of the fuel tank 1, the height by which the fuel cut-off valve 50 projects from the upper wall of the fuel tank 1 is smaller than that of the fill-up control valve 30.

The operation of the fill-up control valve 30 of the present embodiment will be described. When fuel is supplied to the fuel tank 1 equipped with the fill-up control valve 30, through the filler pipe 3 shown in FIG. 1, air in the fuel tank 1 is discharged to the vent line 33 via the connecting pipe 31 and the fill-up control valve 30, and fuel vapors contained in the air are adsorbed by the canister 20.

As air is discharged from the fuel tank 1, the level of the fuel in the fuel tank 1 rises, and finally reaches the full position M. Since the pipe end portion 32 of the connecting pipe 31 connected to the lower end of the fill-up control valve 30 is located at the full position M, the pipe end portion 32 is closed by the fuel when the fuel reaches the full position M, and discharge of air through the connecting pipe 31 is stopped. At the same time, an air chamber K is formed in the upper portion of the fuel tank 1.

With discharge of air thus stopped, the pressure in the air chamber K rapidly increases, and the fuel is rapidly pushed out toward the top portion of the filler pipe 3. However, the fuel is also drawn into the connecting pipe 31 provided at the lower end of the fill-up control valve 30 and having a suitable length, as indicated by an arrow in FIG. 1, and finally reaches the float chamber 40. As a result, the float 35 moves upward depending upon the amount of the fuel entering the float chamber 40, and the valve body 41 disposed on the upper face of the float 35 abuts on the valve seat 38. Consequently, the upward movement of the float 35 is stopped, and the fuel entering the float chamber 40 is kept at a fuel level h as indicated in FIG. 1 and FIG. 2.

In the first embodiment as described above, a head difference H equivalent to the height or distance from the full position M to the fill-up control valve 30 is provided by the connecting pipe 31 having a suitable length. More specifically, the head difference H is a difference between the full position M and the fuel level h at which the fill-up control valve 30 is closed (actuated). With this arrangement, while the pressure in the air chamber K rapidly increases after the fuel tank 1 is filled up, the rapidly increasing pressure in the air chamber K is spent or absorbed by the flow of the fuel over the head difference H, and the pressure rise is mitigated. As a result, the fuel enters the filler pipe 3 under a reduced pressure, or at a reduced rate, and the fuel is thus prevented from spilling out of the top of the filler pipe 3. As the pressure in the fuel tank 1 further increases, refueling is automatically stopped. If the pressure in the fuel tank 1 is subsequently lowered, the fuel in the float chamber 40 and the filler pipe 3 returns to the fuel tank 1 so that the fuel level is lowered to the full position M.

In the first embodiment in which the fill-up control valve 30 is disposed above the floor F of the automobile, or the like, relatively large space is provided above the upper wall of the fuel tank 1, and therefore the floor F can be made horizontal, resulting in an increased degree of flexibility in the choice of the location at which the fuel tank 1 is installed on the automobile.

Second Embodiment

Figure 4:
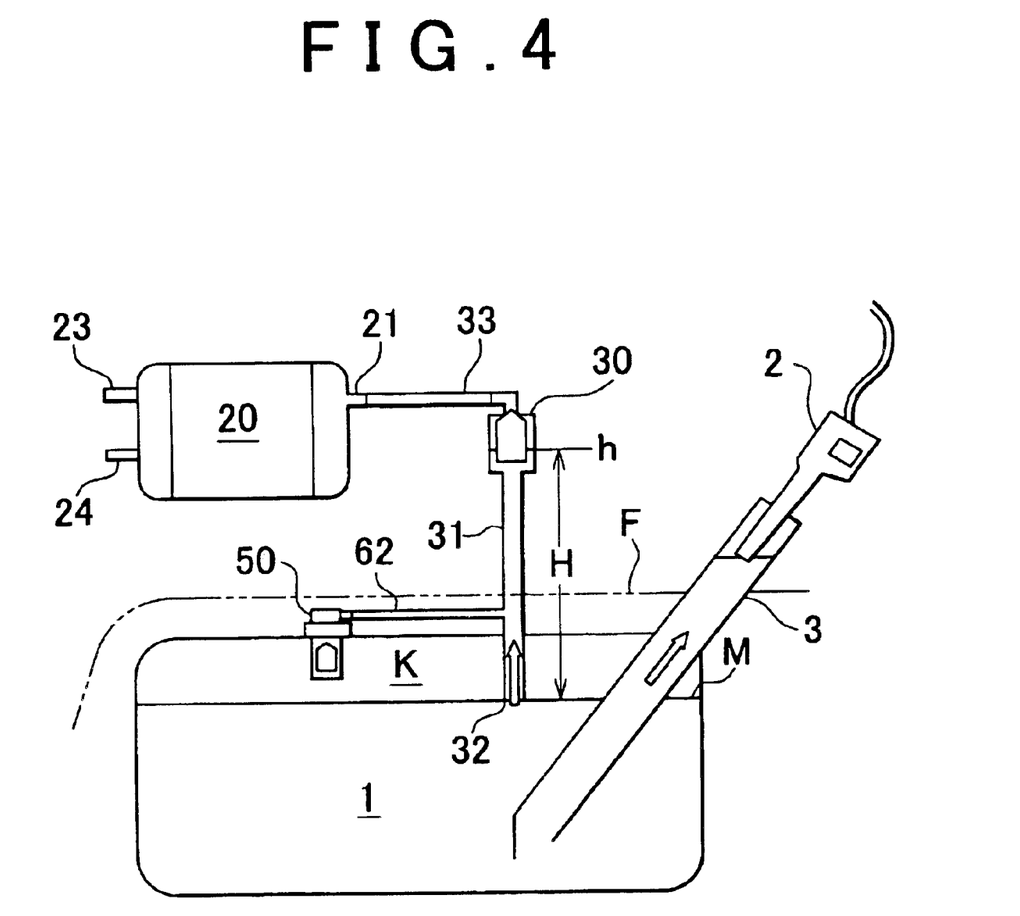
FIG. 4 is a schematic view showing an evaporative fuel control system according to a second embodiment of the invention, which system is mounted on a fuel tank.

FIG. 4 shows an evaporative fuel control system according to the second embodiment of the invention. In this embodiment, the fuel cut-off valve 50 is communicated with the connecting pipe 31 that connects the fill-up control valve 30 with the fuel tank 1, thus eliminating the vapor passage 51 that connects the fuel cut-off valve 50 with the canister 20. In the following description, the same reference numerals as used in the first embodiment will be used for identifying the same components or portions.

As with the first embodiment, the connecting pipe 31 is connected at one end to the fill-up control valve 30, and the other end portion of the connecting pipe 31 is inserted in the fuel tank 1 substantially in the vertical direction. The pipe end portion 32 at the lowest end of the connecting pipe 31 defines the full position M of the fuel tank 1.

The fill-up control valve 30 is located outside and above the fuel tank 1, as shown in FIG. 4. Where the fuel tank 1 is installed on an automobile, or the like, the position of the fill-up control valve 30 is at least above the floor F of the automobile. The connecting pipe 31 is attached to the lower end portion of the fill-up control valve 30, such that the fill-up control valve 30 communicates with the fuel tank 1 via the connecting pipe 31. Also, the vent line 33 is connected at one end to the upper end portion of the fill-up control valve 30 on the downstream side of the valve 30. The vent line 33 is connected at the other end to the canister 20.

The fuel cut-off valve 50 is mounted in the upper portion of the fuel tank 1. Also, the fuel cut-off valve 50 is connected to the connecting pipe 31 that connects the fill-up control valve 30 with the fuel tank 1, via a connecting pipe 62. The connecting pipe 62 is disposed below the floor F, and extends in parallel with and in the vicinity of the upper wall of the fuel tank 1, such that the distance by which the connecting pipe 62 projects from the upper surface of the fuel tank 1 is minimized.

With the connecting pipe 62 provided in the above manner, the vapor passage 51 having a certain length, which was conventionally required, may be eliminated, and the number of assembling steps and the manufacturing cost can be reduced. Also, the connecting pipe 62 is provided in the vicinity of and in parallel with the upper wall of the fuel tank 1, and therefore sufficiently large space is provided above the upper surface of the fuel tank 1, resulting in an increased degree of flexibility in the choice of the location at which the fuel tank 1 is installed on the automobile.

After the fuel tank 1 is filled up, the fuel that has entered the connecting pipe 31 and the fill-up control valve 30 is immediately returned to the fuel tank 1 via the connecting pipe 62 and the fuel cut-off valve 50, so that the fill-up control valve 30 is immediately opened. Thereafter, ventilation in the fuel tank 1 is carried out without fail through the vent line 33 and the connecting pipe 62. If the fuel is used, and the fuel level is lowered below the pipe end portion 32, ventilation is carried out mainly through the connecting pipe 31.

Third Embodiment

Figure 5:
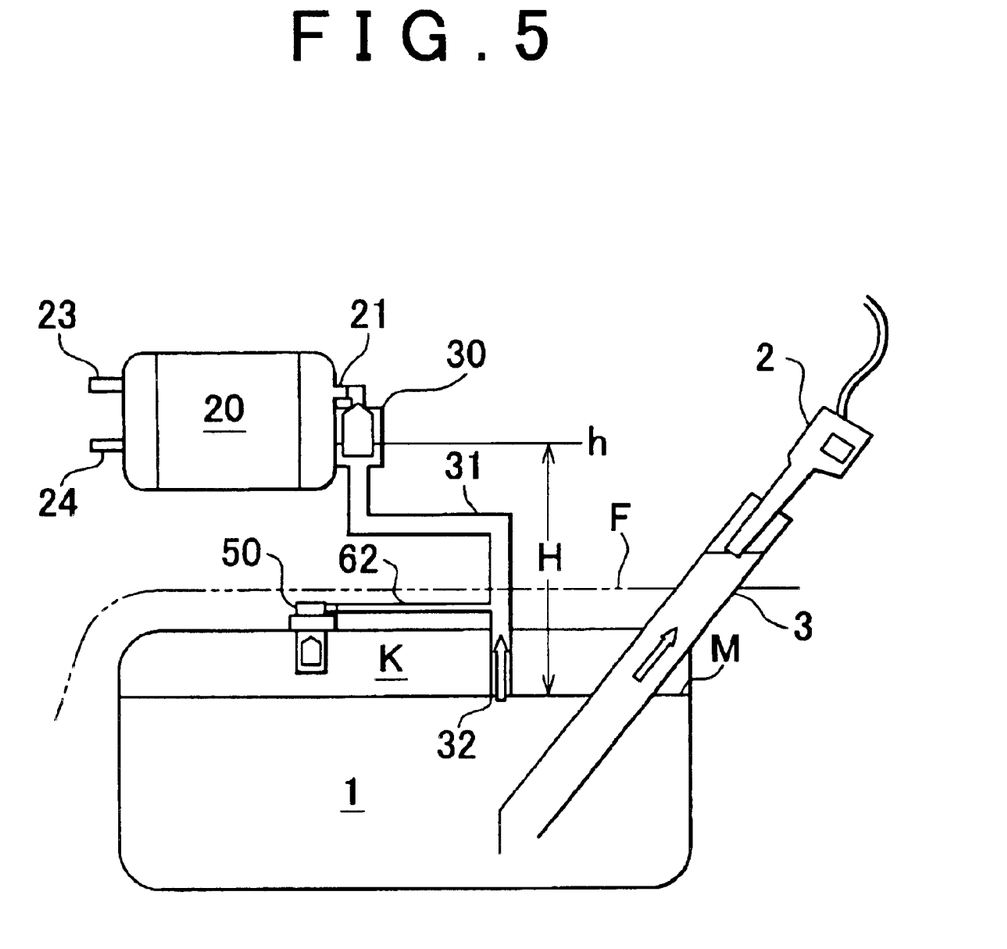
FIG. 5 is a schematic view showing an evaporative fuel control system according to a third embodiment of the invention, which system is mounted on a fuel tank.

FIG. 5 shows an evaporative fuel control system according to the third embodiment of the invention. In this embodiment, the fill-up control valve 30 of the second embodiment is integrated with the canister 20. In the following description, the same reference numerals as used in the first and second embodiments will be used for identifying the same components or portions.

As with the first embodiment, the connecting pipe 31 is connected at one end to the fill-up control valve 30, and the other end portion of the connecting pipe 31 is inserted in the fuel tank 1 substantially in the vertical direction. The pipe end portion 32 at the lowest end of the connecting pipe 31 defines the full position M of the fuel tank 1.

The fill-up control valve 30 is located outside and above the fuel tank 1, as shown in FIG. 5. Where the fuel tank 1 is installed on an automobile, or the like, the position of the fill-up control valve 30 is at least above the floor F of the automobile.

The fill-up control valve 30 is attached integrally to the upper wall of the canister 20 in advance, and the connecting pipe 31 is attached to the lower end of the fill-up control valve 30. With the fill-up control valve 30 thus mounted integrally on the upper wall of the canister 20, the number of pipes and the number of assembling steps can be reduced, resulting in a reduction in the manufacturing cost.

As with the second embodiment, the fuel cut-off valve 50 is mounted on the upper surface of the fuel tank 1, and the fuel cut-off valve 50 is connected to the connecting pipe 31 that connects the fill-up control valve 30 with the fuel tank 1, via the connecting pipe 62. The connecting pipe 62 is located below the floor F, and extends in parallel with and in the vicinity of the upper wall of the fuel tank 1, such that the distance by which the connecting pipe 62 projects from the upper surface of the fuel tank 1 is minimized.

With the connecting pipe 62 provided in the above manner, the vapor passage 51 having a certain length, which was conventionally required, may be eliminated, and the number of assembling steps and the manufacturing cost can be reduced. Also, the connecting pipe 62 is provided in the vicinity of and in parallel with the upper wall of the fuel tank 1, and therefore sufficiently large space is provided above the upper surface of the fuel tank 1, resulting in an increased degree of flexibility in the choice of the location at which the fuel tank 1 is installed on the automobile.

While some exemplary embodiments of the invention have been illustrated above, it is to be understood that the invention is not limited to details of the illustrated embodiments, but may be embodied with various changes, modifications or improvements, which may occur to those skilled in the art, without departing from the spirit of the invention.

What is claimed is:

1. An evaporative fuel control system comprising:
    a canister;
    a vent line that communicates a fuel tank with the canister; and
    a fill-up control valve adapted to control fill-up of the fuel tank, and that comprises a casing, a float disposed in a space formed in the casing such that the float is movable up or down in the space, and a valve body provided in an upper portion of the float,
    wherein the fill-up control valve is disposed in a portion of the vent line, the portion is located outside and above the fuel tank, a head difference is provided between a full level of the fuel tank and the fill-up control valve, and the fill-up control valve is only closed when fuel enters the fill-up control valve.

2. The evaporative fuel control system according to claim 1, wherein the fill-up control valve is attached integrally to the canister.

3. The evaporative fuel control system according to claim 2, wherein the fuel tank is installed below a floor of a vehicle body, and the fill-up control valve is disposed above the floor.

4. The evaporative fuel control system according to claim 1, wherein the fuel tank is installed below a floor of a vehicle body, and the fill-up control valve is disposed above the floor.

5. The evaporative fuel control system according to claim 1, further comprising a fuel cut-off valve mounted in the fuel tank for discharging fuel vapors in the fuel tank to the canister.

6. The evaporative fuel control system according to claim 5, wherein the fill-up control valve is attached integrally to the canister.

7. The evaporative fuel control system according to claim 6, wherein the fuel tank is installed below a floor of a vehicle body, and the fill-up control valve is disposed above the floor.

8. The evaporative fuel control system according to claim 5, wherein the fuel tank is installed below a floor of a vehicle body, and the fill-up control valve is disposed above the floor.

9. The evaporative fuel control system according to claim 5, wherein the vent line that communicates the fuel tank with the canister provides a part of a passage that communicates the fuel cut-off valve with the canister.

10. The evaporative fuel control system according to claim 9, wherein the fill-up control valve is attached integrally to the canister.

11. The evaporative fuel control system according to claim 10, wherein the fuel tank is installed below a floor of a vehicle body, and the fill-up control valve is disposed above the floor.

12. The evaporative fuel control system according to claim 9, wherein the fuel tank is installed below a floor of a vehicle body, and the fill-up control valve is disposed above the floor.

13. The evaporative fuel control system according to claim 1, wherein the fill-up control valve further comprises:
    a spring, wherein the spring does not produce a sufficient force to move the float when the fuel does not exist in the fill-up control valve.

14. The evaporative fuel control system according to claim 1, wherein the fill-up control valve is only closed when the discharge of fuel vapor through the vent line is stopped and fuel enters the fill-up control valve.

* * * * *